US006618807B1

(12) United States Patent
Wang et al.

(10) Patent No.: US 6,618,807 B1
(45) Date of Patent: Sep. 9, 2003

(54) COMPUTER SYSTEM WITH AN EXTERNAL AND PORTABLE ELECTRONIC KEY FOR ENCRYPTION AND DECRYPTION PROCESSES

(75) Inventors: Han-Che Wang, Taipei (TW); Ming-Chih Chang, Taipei (TW)

(73) Assignee: Primax Electronics Ltd., Taipei Hsien (TW)

( * ) Notice: Subject to any disclaimer, the term of this patent is extended or adjusted under 35 U.S.C. 154(b) by 0 days.

(21) Appl. No.: 09/275,086

(22) Filed: Mar. 24, 1999

(30) Foreign Application Priority Data

Jan. 13, 1999 (TW) ........................ 88100448 A

(51) Int. Cl.[7] ................... G06F 11/30; G06F 12/14; H04L 9/32
(52) U.S. Cl. ................... 713/189; 713/185; 713/202; 380/259; 380/278; 380/283
(58) Field of Search ................... 380/44, 259, 278, 380/283; 713/186, 185, 184, 189

(56) References Cited

U.S. PATENT DOCUMENTS

| 4,599,489 A | * | 7/1986 | Cargile .................. 705/52 |
| 5,323,465 A | * | 6/1994 | Avarne .................. 713/184 |
| 5,432,851 A | * | 7/1995 | Scheidt et al. ........... 713/184 |
| 5,623,637 A | * | 4/1997 | Jones et al. ............. 710/13 |
| 5,937,063 A | * | 8/1999 | Davis ................... 713/187 |
| 6,038,320 A | * | 3/2000 | Miller .................. 380/44 |
| 6,094,486 A | * | 7/2000 | Marchant ................ 380/28 |
| 6,351,813 B1 | * | 2/2002 | Mooney et al. .......... 380/259 |

OTHER PUBLICATIONS

PR Newswire, "Tritheim Technologies Announces a Fully-–Integrated Security Solution for PCs PC Defender Utilizes Smart Card Technology to Protect Computer Access and Data", Nov. 16, 1998.*

* cited by examiner

Primary Examiner—Gilberto Barron
Assistant Examiner—Christopher J. Brown
(74) Attorney, Agent, or Firm—Winston Hsu

(57) ABSTRACT

The present invention provides a computer system comprising a system memory, a processor, a cryptoprogram, an I/O port, and an electronic key. The electronic key can be inserted into and removed from the I/O port and contains a programmable memory that stores passwords. The cryptoprogram is used to encrypt and decrypt programs or files stored in the system memory. Encryption of programs or files is accomplished according to a password that is stored in the programmable memory of the electronic key. During decryption, the cryptoprogram searches for the corresponding password in the programmable memory of the key and decrypts the program or file if the password is found.

7 Claims, 1 Drawing Sheet

COMPUTER SYSTEM WITH AN EXTERNAL AND PORTABLE ELECTRONIC KEY FOR ENCRYPTION AND DECRYPTION PROCESSES

BACKGROUND OF THE INVENTION

1. Field of the Invention

The invention relates to a computer system, and more particularly, to a computer system with a portable electronic key.

2. Description of the Prior Art

Data encryption of a computer system is commonly performed by using either software or hardware techniques. An example of a software technique is performed by using a cryptoprogram. Unfortunately, cryptoprograms can be easily broken through thus making all data insecure. In terms of techniques of maintaining data security by using hardware, a hardware key is popularly used. However, the hardware key is difficult to be disconnected from the computer system and is inconvenient to be carried around. Therefore, users often leave it on the computer system. This makes the hardware key easily accessible to others to steal or to reproduce thus compromising security.

SUMMARY OF THE INVENTION

It is therefore a primary objective of the present invention to provide a computer system with a portable electronic key to solve the above mentioned problems.

Briefly, in a preferred embodiment, the present invention provides a computer system comprising:

a system memory for storing programs and files;

a processor for executing the programs stored in the system memory;

a cryptoprogram for encrypting or decrypting a program or file stored in the system memory;

an I/O (input/output) port connected to the processor; and an electronic key which can be inserted into and removed from the I/O port comprising a programmable memory for storing passwords;

wherein when encrypting a program or file stored in the system memory, the cryptoprogram encrypts the program or file according to a password and stores the password in the programmable memory of the electronic key, and when decrypting a program or file stored in the system memory, the cryptoprogram searches for a corresponding password in the programmable memory of the key and decrypts the program or file if the corresponding password is found.

It is an advantage of the present invention that the computer system according to the present invention uses an electronic key and a cryptoprogram for enhancing data security. The password is stored in the electronic key which is separate from the computer thus securing the data.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
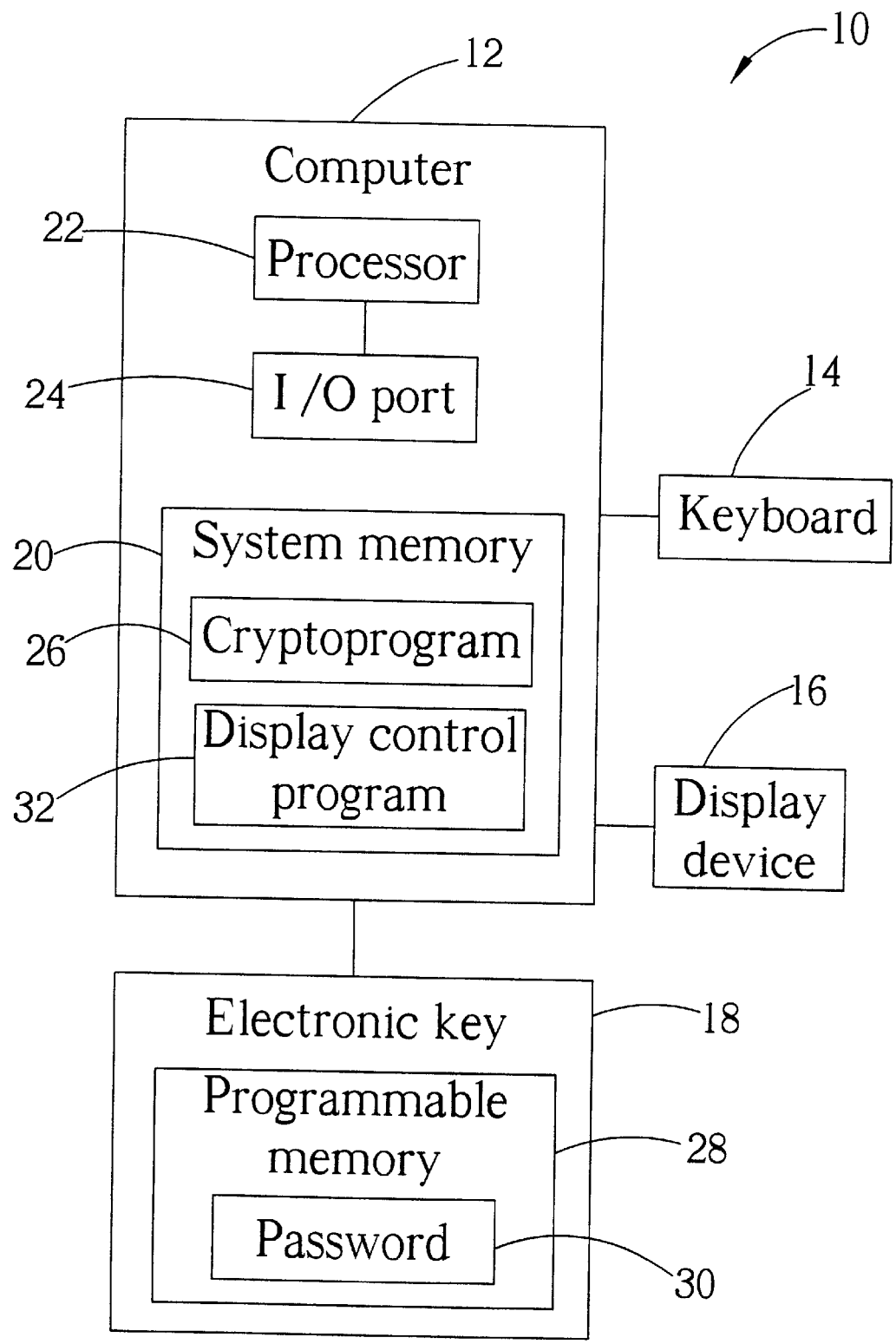
FIG. 1 is a functional block diagram of a computer system according to the present invention.

Please refer to FIG. 1. FIG. 1 is a functional block diagram of a computer system 10 according to the present invention. The computer system 10 comprises a computer 12, a display device 16, a keyboard 14, and a portable electronic key 18. The computer 12 comprises a system memory 20 for storing programs and files, a processor 22 for executing the programs stored in the system memory 20, an I/O (input/output) port 24 connected to the processor 22, a cryptoprogram 26 stored in the system memory 20 for encrypting or decrypting a program or file, and a display control program 32 stored in the system memory 20 for displaying a program or file on the display device 16 in the form of an icon. The user can use the keyboard 14 for inputting a password to the cryptoprogram 26 or changing a password used by the cryptoprogram 26.

The electronic key 18 can be inserted into and removed from the I/O port 24, and it comprises a programmable memory 28 for storing passwords 30. The programmable memory 28 of the electronic key 18 is an EEPROM (electrically erasable programmable read only memory) The electronic key 18 can be any portable device or peripheral of a computer. For example, the electronic key 18 can be a mouse which can generate cursor control signals with the I/O port 24 being a serial port for connecting the mouse. The electronic key 18 can also be a memory card with a connector installed at its front end for connecting the programmable memory 28 to the I/O port 24 with the I/O port 24 being a USB (universal serial bus) port for plugging in the memory card. The electronic key 18 can also be a keypad, or any other I/O device.

When encrypting a program or file stored in the system memory 20, a user must connect the electronic key 18 to the I/O port 24 and input a password 30 by using the keyboard 14. The cryptoprogram 26 will then encrypt the program or file according to the password 30 and store the password 30 in the programmable memory 28 of the electronic key 18. Under these circumstances, the display control program 32 will not display the icon representing the program or file. In this way, the file or program is effectively hidden.

When decrypting a program or file, the user must connect the electronic key 18 to the I/O port 24 and input a password by using the keyboard 14. The cryptoprogram 26 then searches for a corresponding password 30 in the programmable memory 28 of the key 18. If the inputted password is the same as the password 30 previously inputted when encrypting, the cryptoprogram 26 will decrypt the program or file according to the password 30, and the display control program 32 will display the icon representing the program or file on the display device 16. If the inputted password is different from the password 30, the cryptoprogram 26 will not find the corresponding password 30 in the programmable memory 28, and the display control program 32 will not display the icon representing the program or file on the display device 16.

The computer system 10 uses an electronic key 18 and a cryptoprogram 26 for performing data encryption, thus both hardware and software techniques are employed to improve data security. Moreover, because the electronic key 18 such as a mouse or a memory card can be easily disconnected from the I/O port 24 and is portable, it can be removed from the I/O port 24 to prevent reproduction or stealing. Furthermore, the password 30 is stored in the programmable memory 28 of the electronic key 18, thus the password 30 cannot be searched unless the electronic key 18 is connected to the I/O port 24. Therefore data security is greatly enhanced.

In contrast to the prior art computer system, the computer system 10 according to the present invention uses an electronic key 18 that is removable from the computer and a cryptoprogram 26 for data security with the password being stored in the electronic key 18, not the computer 12. Therefore, data security is assured.

Those skilled in the art will readily observe that numerous modifications and alterations of the system may be made while retaining the teachings of the invention. Accordingly, the above disclosure should be construed as limited only by the metes and bounds of the appended claims.

Those skilled in the art will readily observe that numerous modifications and alterations of the system may be made while retaining the teachings of the invention. Accordingly, the above disclosure should be construed as limited only by the metes and bounds of the appended claims.

What is claimed is:

1. A computer system comprising:
   a system memory for storing programs, files, and a display control program for displaying the programs or files stored in the system memory on a display device in the form of an icon;
   a processor connected to the display device for executing the programs stored in the system memory;
   a cryptoprogram for encrypting or decrypting a program or file stored in the system memory;
   an I/O (input/output) port connected to the processor; and
   an electronic key which can be inserted into and removed from the I/O port comprising a programmable memory for storing passwords;
   wherein when encrypting a program or file stored in the system memory, the cryptoprogram encrypts the program or file according to a password and stores the password in the programmable memory of the electronic key, and the display control program conceals the icon representing the program or file, and when decrypting a program or file stored in the system memory, the cryptoprogram searches for a password corresponding to the program or file in the programmable memory of the key and decrypts the program or file if the corresponding password is found, and the display control program displays the icon representing the program or file on the display device.

2. The computer system of claim 1 further comprising an input device connected to the processor for inputting a password to the cryptoprogram or changing a password used by the cryptoprogram.

3. The computer system of claim 2 wherein the input device is a keyboard.

4. The computer system of claim 1 wherein the programmable memory of the electronic key is an EEPROM.

5. The computer system of claim 1 wherein the I/O port is a serial port or a universal serial bus (USB) port.

6. The computer system of claim 1 wherein the key is built in a mouse which can be used for generating pointing signals.

7. The computer system of claim 1 wherein the key is a memory card with an electrical connector for electrically connecting the programmable memory in the key to the I/O port.

* * * * *